United States Patent [19]
Wissmann

[11] Patent Number: 4,890,726
[45] Date of Patent: Jan. 2, 1990

[54] CARRIER FOR BOTTLE PREFORMS
[75] Inventor: Siegfried R. Wissmann, Cincinnati, Ohio
[73] Assignee: Cincinnati Milacron, Inc., Cincinnati, Ohio
[21] Appl. No.: 239,267
[22] Filed: Sep. 1, 1988
[51] Int. Cl.⁴ .............................................. B66C 1/54
[52] U.S. Cl. .............................. 198/803.12; 198/803.8; 294/93
[58] Field of Search ........................ 198/803.8, 803.12; 425/525, 534; 264/538, 542, 543; 294/93, 94, 98.1; 277/205, 206 R; 285/345, 346; 49/480, 490

[56] References Cited
U.S. PATENT DOCUMENTS

| 3,199,552 | 8/1965 | Nordfors | 198/803.8 X |
| 4,086,999 | 5/1978 | McDonald | 294/93 X |
| 4,173,368 | 11/1979 | Haverbusch | 294/93 X |
| 4,185,812 | 1/1980 | Hall | 269/56 |
| 4,382,760 | 5/1983 | Wiatt et al. | 425/139 |
| 4,456,447 | 6/1984 | Smith | 425/182 |
| 4,572,355 | 2/1986 | Hunter | 198/803.12 |
| 4,658,847 | 4/1987 | McCrone | 49/480 X |
| 4,678,425 | 7/1987 | Gibbemeyer | 425/522 |

Primary Examiner—Robert J. Spar
Assistant Examiner—Lyle K. Kimms
Attorney, Agent, or Firm—Laurence R. Brown; Alfred J. Mangels

[57] ABSTRACT

A preform carrier adapted to be received in the open end of a wide mouth tubular container preform for internally gripping the preform to permit carrying the preform from a heating station to a container blowing station. The carrier includes a flexible annular gripping member in the form of a gripping and sealing ring that is resiliently flexible in a radial direction, relative to the preform axis, for engaging the inner surface of the preform finish. The gripping member includes an annular sealing ridge on its outermost surface for gripping and sealing against the inner surface of the preform finish. The gripping member is of generally U-shaped configuration, and includes an inner annular U-shaped spring for urging the legs of the sealing ring outwardly to provide a gripping and sealing force against the inner surface of the preform finish.

15 Claims, 3 Drawing Sheets

CARRIER FOR BOTTLE PREFORMS

BACKGROUND OF THE INVENTION

1. Field of the Invention

This invention relates to a carrier for tubular articles, and more particularly to a carrier for gripping and transporting tubular preforms of thermoplastic material from which bottles or jars are formed by a blowing process. The carrier is adapted to carry heated bottle preforms between a heating station and a bottle blowing station in a reheat-blow-type blow molding machine.

2. Description of the Related Art

In apparatus for making bottles and jars by the extrusion-blow molding technique, typically a soft tubular parison that is open at both ends is transported from an extruder to a two-piece mold to be blown to expand to the interior size of the mold, cooled, and then trimmed of excess material. The neck area of the bottle or jar is formed simultaneously with the body while the parison is within the mold. In reheat and blow apparatus, a preform is injection molded to provide a tubular structure that is open at one end and closed at the other end, similar to a test tube. The neck portion, referred to as the finish, is completely formed during the injection molding process, and the preforms can be cooled and stored for later use. When a bottle is to be formed, the body of the preform is reheated in a suitable heating device, and the heated preform is thereafter carried to and placed in a bottle mold with the neck or finish extending outwardly of the mold. Pressurized air is then introduced into the preform through the neck to expand the preform body against the mold walls to form the desired bottle or jar.

Transportation of heated preforms is often carried out by employing a pallet that includes several preform holders to hold the preforms at their neck or finish area and then to carry them to the blow molding station. Some machines are arranged to carry the preforms in an inverted condition, with the open end of the preform facing in a downward direction. Other machines carry the preforms in an upright condition, with the open end facing upwardly.

When handling upright preforms, it is easier to grip the preforms internally, at the interior of the neck, rather than exteriorly, because the threads make it difficult to securely grip the outer portion of the neck without thread damage, and they also make it difficult to obtain a tight seal between the carrying device and the threads, to prevent loss of blowing pressure during the blowing operation.

One form of preform carrier for transporting tubular preforms in an upright condition by supporting the preform at the interior surface of the neck is shown in U.S. Pat. No. 4,678,425, which is owned by the assignee of the present application. The preform carrier disclosed in that patent is referred to as a spindle nose, and is in the form of an annular sleeve of plastic material that is flexible to provide a seal between it and the preform. Although that type of carrier is quite satisfactory for general use, it has been found that when wide mouth bottles or jars are to be blown, the greater variation in the size of the inner diameter of the preforms, resulting from the normal manufacturing tolerances, and the limited flexibility of a large diameter annular sleeve of the configuration shown in the patent, sometimes results in an imperfect seal between the carrier and the preform, leading to incompletely formed bottles or jars because the desired blowing pressure could not be maintained on preforms whose finish inner diameter was at or slightly above the upper tolerance limit. Additionally, upright preforms having a larger diameter finish are more difficult to carry by frictional engagement between the annular sleeve disclosed in that patent and the preform finish. There is therefore a need for an improved carrier that can simultaneously carry a wide mouth preform and also provide an adequate seal over a wide diametral tolerance range.

It is an object of the present invention to provide a preform carrier that overcomes the shortcomings of the previously-employed carriers and to avoid the problems noted above.

SUMMARY OF THE INVENTION

Briefly stated, in accordance with one aspect of the present invention, a preform carrier is provided for supporting and carrying tubular preforms having an open end defining a container opening. The carrier includes a cylindrical central body member adapted to be received through the open end of the preform and extending into the preform a predetermined axial distance. A resilient, annular gripping member is removably carried by the cylindrical body member and includes a substantially U-shaped, flexible gripping ring defined by a transverse wall and a pair of spaced legs depending from the transverse wall, at least one of the legs including an outwardly extending annular protrusion to define a gripping and sealing surface. An annular spring is positioned within the gripping member and acts against the respective legs to resiliently urge them apart to provide the gripping force on the inner surface of the preform finish. A retaining means is provided for retaining the gripping member on the body member.

DESCRIPTION OF THE PREFERRED EMBODIMENTS

Figure 1:
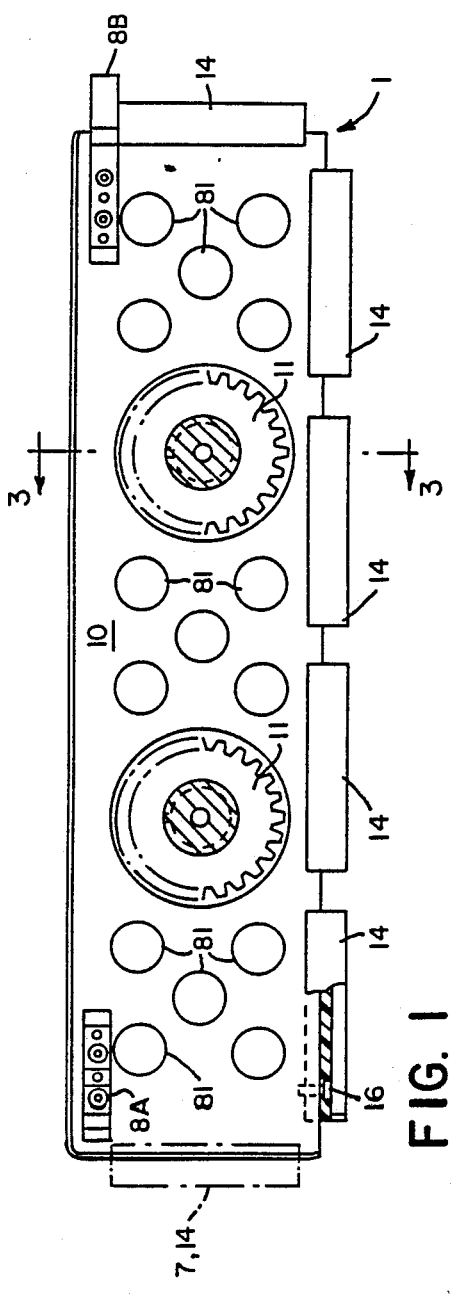
FIG. 1 is a top plan view of a pallet member for supporting a pair of rotatable preform carriers adapted to carry bottle or jar preforms in accordance with the present invention.
Figure 2:
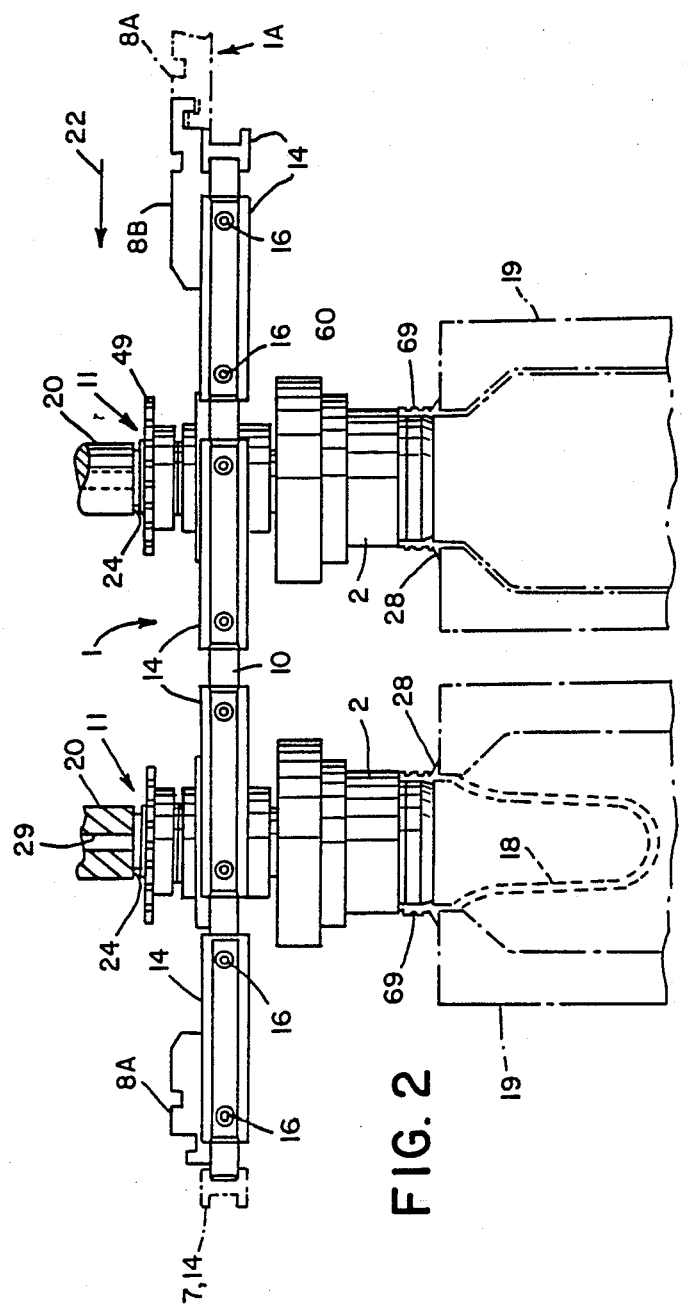
FIG. 2 is a side view of the apparatus illustrated in FIG. 1, showing a pair of preform carriers in accordance with the present invention, one preform carrier supporting a wide-mouth bottle preform before it is blown into a bottle and a second preform carrier supporting a bottle after it has been blown from a preform.

Referring now to the drawings, and particularly to FIGS. 1 and 2 thereof, there is shown a pallet assembly 1 including a pair of preform carriers 2 that are rotatably carried in the pallet. The phantom lines in FIGS. 1 and 2 show the outlines of blow molds 19 and part of an adjoining pallet 1A. The pallets are suitably supported for movement along a machine frame (not shown) that carries and supports frame members 7. Latch means 8A and 8B carried by pallets 1 permit them to be connected to an adjacent pallet, e.g. pallet 1 to pallet 1A as shown in FIG. 2. The pallets are adapted to be carried along suitable frame members 7 to traverse a path having a generally rectangular shape, preferably past preform loading, reheating, blowing and ejecting work stations.

Pallet assembly 1 includes a pallet baseplate 10 in which are rotatably supported two spindles 11 which, in turn, support preform carriers 2, and are so constructed that they can rotate with respect to baseplate 10. The contemplated operation of the machine involves the pallet circulating in a predetermined path and in a horizontal plane, so the rotation is substantially about a vertical axis.

Pallet assembly 1 slides with reference to the machine frame 7 (see FIG. 3) and carries a plurality of grooved bearing supports in the form of injection molded plastic guide strips 14 arranged so that four such strips are positioned on one side of baseplate 10 and one on one end thereof. The other side and end of the baseplate define outwardly extending tongues that engage with grooves in corresponding guide strips on adjoining baseplates 1A or on machine frame 7. Guides 14 are preferably each secured to baseplate 10 by a plurality of screws 16 that are received in threaded holes in the corresponding edges of the baseplate.

First and second latch means 8A, 8B are provided on the upper surface of baseplate 10, one at each end thereof to connect in end-to-end fashion with a latch means carried by a similarly constructed pallet assembly for joint movement along the predetermined path of travel in a blow molding machine. Latch arrangements of different types are known in this particular art (see, for example, U.S. Pat. No. 4,185,812) but the two latches 8A, 8B herein shown and described have different dimensions and, although their notches match mechanically with another 8B or 8A, respectively, they are not interchangeable with each other.

Figures 3, 4, 5:
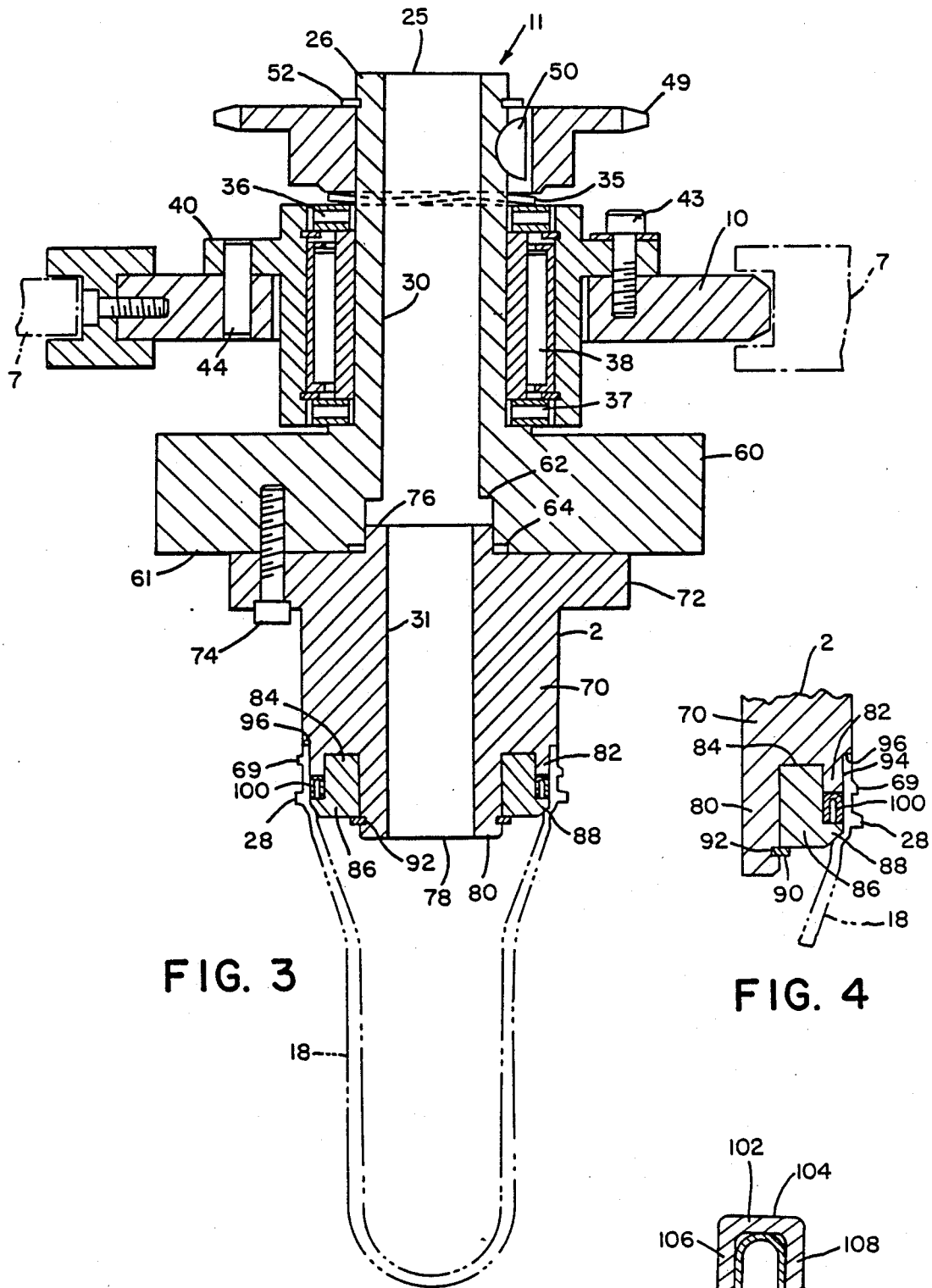
FIG. 3 is an enlarged, fragmentary cross-sectional view of a preform carrier in accordance with the present invention and taken along the line 3—3 of FIG. 1.
FIG. 4 is an enlarged, fragmentary, cross-sectional view of the lowermost portion of the preform carrier illustrated in FIG. 3, showing a gripping ring for gripping and sealing against the inner surface of the finish of the bottle preform.
FIG. 5 is an enlarged, cross-sectional view taken transversely through the sealing and gripping ring shown in FIGS. 3 and 4.
Figure 6:
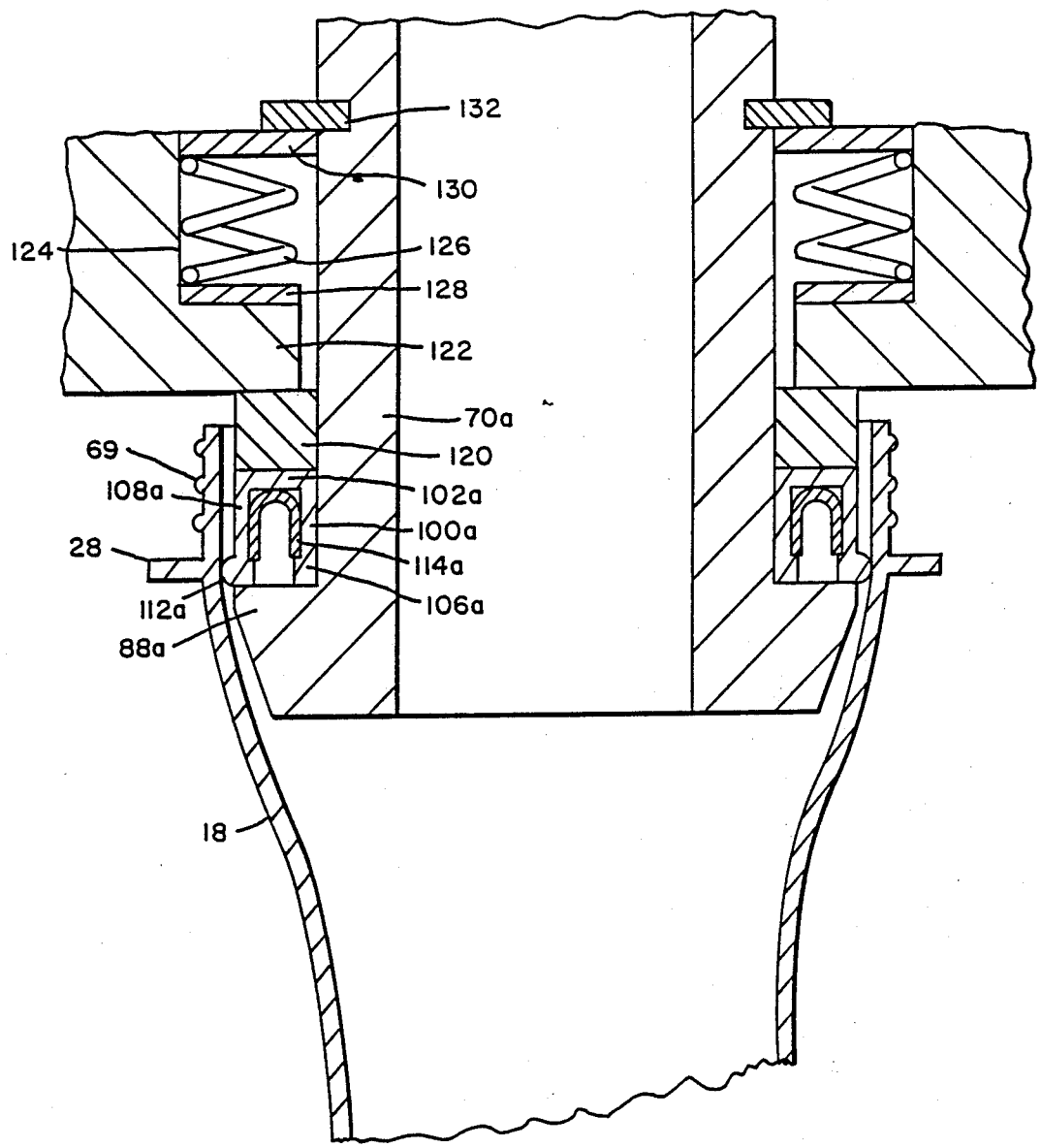
FIG. 6 is an enlarged, fragmentary, cross-sectional view of another embodiment of a preform carrier and sealing ring in accordance with the present invention.

FIGS. 2, 3, and 6 illustrate the structural interrelationship of pallet assembly 1, preform carriers 2, and preforms 18 carried therein, and several blow station components. After pallet assembly 1 carrying two preforms 18 has come to rest at the blow station, blow molds 19 each enclose a respective preform, as shown in FIG. 2, and stuffers 20, which are tubular air supply conduits for conveying compressed air into spindles 11, are moved down to press against the top of the pallet assembly 1 in preparation for blowing. Thereafter, pallet assembly 1 is moved in the direction of arrow 22 and the blow molds 19 are moved in a direction normal to the plane of the paper of FIG. 2. A face seal 24 is established between the lowermost ends of stuffers 20 and the tops of corresponding spindles 11 by providing a flat surface on the bottom of stuffers 20 and a flat surface 25 on the tops of each spindle shaft 26 (see FIG. 3). The blow molding machine, by apparatus not shown, vertically reciprocates stuffers 20 causing them to descend, to establish the face seal by engaging the corresponding top flat surface on the spindle, and then to continue descending sufficiently to provide a sealing force at face seal 24 and also to impose a downwardly directed force on spindles 11 so that the outwardly extending neck ring 28 on each preform bears against a corresponding surface of the associated blow mold 19.

It is to be understood that there will be variations in preform dimensions, and also in the compressibility of the spindle structure between the stuffer and the area over which the preform neck ring 28 bears on blow mold 19. In order to accommodate such variations while still maintaining a satisfactory face seal to permit the flow of compressed air through passageway 29 in stuffer 20, through spindle passageway 30, and through preform carrier passageway 31, the apparatus includes structure to permit the axial reciprocation of spindle 11 relative to pallet baseplate 10. However, the amount of axial reciprocation include the spindle assembly reset spring 35 (preferably an annular wave spring) and a bearing assembly that supports the spindle 11. The bearing assembly includes axially spaced upper and lower thrust bearings 36, 37, respectively, between which is mounted a needle bearing 38 having an inner race press fitted on the spindle shaft 26. The bearing assembly is carried in a flanged hub 40 that supports the bearings and is, in turn, secured to pallet baseplate 10 by a plurality of cap screws 43, and is precisely positioned relative thereto by a roll pin 44. The roller elements of the thrust bearings have radial clearances at both their inside and outside diameters, and the axial spacing between the thrust bearings in hub 40 is defined by a pair of internally positioned snap rings.

Immediately below seal surface 25 on spindle shaft 26, a drive sprocket 49 is non-rotatably mounted, preferably using a key 50, and a snap ring 52 retains the drive sprocket against axial shifting in an upward direction. The bottom of spindle shaft 26 terminates in a mounting flange 60, which is nonrotatably secured to shaft 26, or, preferably, is made integral therewith. Spindle air passage 30 extends axially through shaft 26 and axialaly through mounting flange 60, as best seen in FIG. 3. Flange 60 includes a transversely extending support surface 61, against which preform carrier 2 is held. Air passage 30 of spindle shaft 26 joins with air passage 31 of preform carrier 2. Mounting flange 60 includes a locating recess 62 in the form of a counterbore coaxial with air passage 30, and recess 62 includes an annular gasket recess 64 adapted to receive an O-ring (not shown) for providing a seal between mounting flange 60 and preform carrier 2.

Referring once again to FIG. 3, there is shown a cross-sectional view of spindle 11 carrying a bottle preform 18 that is supported by preform holder 2. As shown, preform 18 is carried at its open end such that the open end faces upwardly. Preform holder 2 includes a tubular body 70 through which passageway 31 axially extends. Passageway 31 communicates with spindle passageway 30, which, in turn, communicates with passageway 29 in stuffer 20 (see FIG. 2).

The uppermost end of tubular body 70 includes a flange 72 adapted for mounting preform holder 2 to mounting flange 60, and a plurality of cap screws 74 are provided to securely attach holder flange 70 to the lowermost surface of mounting flange 60. Preform holder 2 includes a concentric annular boss 76 that is concentric with passageway 31 and extends outwardly from flange 72. Boss 76 is received in locating recess 62 in mounting flange 60 to accurately position preform holder 2 relative to mounting flange 60.

The lowermost end of tubular body 70 includes a central opening 78 to permit the blowing air to pass through passageway 31 and into the interior of preform 18 during the blowing operation, to expand the body of the preform against the walls of the blow mold 19, as illustrated in FIG. 2. An inner annular sleeve 80 surrounds passageway 31 and opening 78 and extends partially into the interior of preform 18. Spaced radially outwardly from and concentric with inner annular sleeve 80 is an outer annular sleeve 82 that also extends axially relative to tubular body 70, but for a shorter axial distance than inner annular sleeve 80. The radial space between inner annular sleeve 80 and outer annular sleeve 82 defines an annular recess 84 to receive an annular ring 86, which is substantially L-shaped in cross-section, and which includes a radially outwardly extending lip 88. A retaining ring 90 is received in an annular slot 92 in inner annular sleeve 80 to retain ring 86 in position in annular recess 84.

Outer annular sleeve 82 has its radially outermost surface 94 (see FIG. 4) spaced inwardly from the outer surface of tubular body 70 to define a step 96 against which the outer end surface of preform finish 69 is adapted to be received.

Downwardly facing surface 98 of outer annular sleeve 82 is positioned axially opposite from and spaced from radially outwardly extending lip 88 of ring 86 to define an annular slot within which is positioned an annular sealing ring 100 that has a generally U-shaped cross-section. Sealing ring 100 is flexible in a radial direction and is adapted to engage against the inner surface of finish 69 of preform 18 to simultaneously grip the surface for holding the preform in position, and also to provide a seal against the inner surface of the preform finish to contain pressurized blowing air and thereby permit the preform to be blown into a bottle or a jar.

Sealing ring 100 is shown in enlarged form in FIG. 5, which is a cross-sectional view, and it is to be understood that the sealing ring itself is of annular construction, as is apparent from FIG. 3. Sealing ring 100 includes a transversely extending upper wall 102 that is positioned in a generally radial direction relative to the axis of preform holder 2, and the uppermost surface 104 faces downwardly facing surface 98 of outer annular sleeve 82 (see FIG. 4). Depending downwardly from transverse wall 102 are an inner leg 106 and an outer leg 108, which together with transverse wall 102 define the generally U-shaped cross-section of sealing ring 100. Each of inner leg 106 and outer leg 108 includes a sealing ridge 110, 112, respectively, and ridges 110, 112 extend radially outwardly in opposite directions for respective predetermined radial distances.

Positioned within the interior of sealing ring 100 is an annular, U-shaped spring 114, the purpose of which is to bias inner leg 106 and outer leg 108 outwardly away from each other, and in a radial direction when considered in the context of the axis of sealing ring 100. Sealing ridge 110 abuts annular ring 86, and sealing ridge 112 abuts the inner surface of finish 69 of preform 18. Sealing ridge 112 is preferably continuous about the outer circumference of sealing ring 100, in order to provide the desired seal aagainst the inner surface of the preform finish. Additional sealing force is provided by the pressure of the blowing air that passes between the interior of preform 18 and retaining lip 88 and that acts on the inner surfaces of the U-shaped sealing ring to expand the ring in a radial direction.

The increased flexibility of sealing ring 100 as compared with the annular sleeve disclosed in U.S. Pat. No. 4,678,425, to which reference was made earlier, reduces the need for a tight face seal between the top surface of finish 69 and step 96 (see FIG. 4), and also avoids the imposition of excessive radial force against the inner surface of finish 69.

Sealing ring 100 is preferably made from a heat resistant, yet flexible material to permit it to resiliently grasp and hold a heated preform, and to carry preforms that have somewhat varying inner diameters. It has been found that a suitable sealing ring to provide the desired function and operation is a high temperature Teflon sealing ring, such as Teflon spring seals manufactured by the Mechanical Seal Division of Fluorocarbon Company, Los Alamitos, Cal. Such seals have been found to be eminently suitable for the purpose herein described because they result in low frictional force between the ring and the preform finish, which facilitates insertion on and removal of the preform from the sealing ring, and because they are capable of withstanding temperatures of the order of 500° F., whereas the preforms are usually at a temperature of from about 250 to 300° F.

Another form of preform holder and sealing ring are shown in FIG. 6. As there shown, tubular body 70a has a thinner wall than tubular body 70 illustrated in FIG. 3, and the lowermost portion of the tubular body includes an integral, radially outwardly extending lip 88a. Carried around tubular body 70a and adjacent the step defined by the outwardly extending lip 88a is a sealing ring 100a of generally U-shaped configuration, and similar to sealing ring 100 illustrated in FIGS. 3,4, and 5, except that only outer leg 108a includes a sealing ridge 112a.

Sealing ring 100a is axially held in position by an annular spacer ring 120 that is positioned above transverse wall 102a. Spacer ring 120 abuts the downwardly facing surface of an annular mounting ring 122, which can be connected to a mounting flange by cap screws, or the like, similar to the arrangement illustrated in FIG. 3. Mounting ring 122 includes a counterbore 124 to receive one or more springs 126 that are positioned between an inner annular spring retaining ring 128 and an outer annular spring retaining ring 130, each of which surrounds tubular body 70a. A retaining ring 132 is provided adjacent the uppermost surface of tubular body 70a to bear against the upwardly facing surface of outer spring retaining ring 130. Springs 126 serve to maintain axial pressure on spacer ring 120 and on sealing ring 100a.

As in the embodiment illustrated in FIGS. 3 through 5, sealing ring 100a includes an annular, U-shaped metallic spring 114a to bear against the inner and outer legs of sealing ring 100a to cause the seal to flex in a radial direction to accept preform finishes of varying inner diameters, and also to provide a seal against the inner surface of the finish of a preform to permit blowing of the preform into a bottle or jar.

A wide range of preform holder sizes can be provided to accommodate a correspondingly wide range and variety of preforms. Illustrated in FIG. 2 is preform having the contours of a typical 77 mm. thread outside diameter (OD) while on the right hand side of FIG. 2 is illustrated a blown container having the shape of a 77 mm. thread finish jar of the kind used, e.g., for peanut butter or mayonnaise.

As shown in FIG. 1, baseplate 10 can include a plurality of holes 81 therein, both to reduce its weight and also to allow air to flow therethrough during heating of the preforms.

In operation, a pallet assembly 1 having a plurality of heated preforms is conveyed to a blowing station as shown in FIG. 2, and stuffer 20 is caused to descend to establish face seal 24 against spindle 11. Spindle reset spring 35 is compressed to almost a flat position as a consequence of pushing the spindle 11 down relative to the pallet baseplate 10.

Ordinarily, at the blow mold there is no rotation of spindle 11, and support ring 28 of preform 18 contacts the uppermost surface of mold 19. Compressed air passes into preform 18 from the passageways 29, 30, 31 which are fluid-tight at the face seals due to the force from stuffer 20.

At the end of the blowing operation, when the preform has been expanded against the inner surfaces of the blow mold, stuffers 20 are vertically retracted and the blow molds open. The upward movement of stuffers 20 permits reset springs 35 to return to their free height, e.g. as in FIG. 3, and suitable conveying means (not shown) moves pallet 1 away from the blowing station, in the direction of arrow 22 in FIG. 2, to an ejection station where the resulting bottle or jar is removed from the preform holder. Thereafter, the pallet is conveyed to a loading station (not shown) and new preforms are inserted onto preform carriers 2 and the entire cycle of heating, blowing and removal is repeated.

When it is desired to change preform carriers, tubular body 70 is removed from spindle 11 by removing bolts 74. Another preform carrier can then be installed.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A preform carrier for supporting and carrying tubular container preforms having an open end defining a container opening, said carrier comprising:
   (a) a cylindrical central body member adapted to be received through the open end of the preform and extending into the interior of the preform;
   (b) a resilient annular gripping member carried by the body member, the gripping member being a flexible ring having a substantially U-shaped cross section defined by a base portion and a pair of spaced, depending legs;
   (c) annular spring means positioned with the gripping member and against the respective legs to resiliently urge the legs apart; and
   (d) retaining means for retaining the gripping member on the body member.

2. A preform carrier in accordance with claim 1, wherein at least one of the legs includes an outwardly extending annular ridge defining a sealing surface engageable with the inner surface of the finish of a container preform.

3. A preform carrier in accordance with claim 2, wherein the annular ridge is positioned on a radially outermost surface of the gripping member.

4. A preform carrier in accordance with claim 3, wherein the annular ridge is positioned intermediate upper and lower edges of a leg of the gripping member.

5. A preform carrier in accordance with claim 4, wherein the annular ridge is adjacent the free end of the leg.

6. A preform carrier in accordance with claim 2, wherein each leg includes an outwardly extending annular ridge.

7. A preform carrier in accordance with claim 1, wherein the spring means is a metallic annular spring having a U-shaped cross section adapted to be received within a U-shaped recess in the gripping member.

8. A preform carrier in accordance with claim 1, wherein the carrier includes an annular step to define a seat for the upper surface of the preform finish.

9. A preform carrier in accordance with claim 8, wherein the central body member includes an annular recess to receive the flexible ring, the annular recess spaced axially from and radially inwardly of the annular step.

10. A preform carrier in accordance with claim 9, wherein the annular recess is defined by a ring member removably received on the central body member, the ring member having an annular body portion and an outwardly extending flange adjacent one end of the annular body portion.

11. A preform carrier in accordance with claim 1, wherein the central body member includes an outer annular sleeve and an inner annular sleeve that is spaced from the outer sleeve to define an annular recess, an annular ring adapted to be received within the annular recess, the ring having an outwardly extending lip spaced axially from the outer annular sleeve to define an annular slot to receive the gripping member.

12. A preform carrier in accordance with claim 11, wherein the tubular body portion includes spring means for resiliently urging the annular mounting flange toward the stepped portion for retaining the gripping member in position.

13. A preform carrier in accordance with claim 11, wherein the tubular body portion includes an annular, inwardly extending step spaced axially from the gripping member for receiving the axially outermost portion of the finish, an annular recess spaced axially from and radially inwardly from the inwardly extending step, and retaining means received within the annular recess for retaining the gripping member.

14. A preform carrier in accordance with claim 13, including spacer ring means positioned between the annular mounting flange and the step on the tubular body means to space the gripping member from the mounting flange.

15. A preform carrier in accordance with claim 11, including a rotatable spindle for receiving the cylindrical body member, and positioning means carried by the central body member and cooperable with positioning means carried by the spindle for limiting relative radial movement between the body member and the spindle.

* * * * *